United States Patent [19]

Goolsbey et al.

[11] Patent Number: 4,817,186
[45] Date of Patent: Mar. 28, 1989

[54] LOCATING INDIVIDUAL IMAGES IN A FIELD FOR RECOGNITION OR THE LIKE

[75] Inventors: Michael A. Goolsbey; Eugene R. Jones, both of Rochester, Minn.; William F. Micka, Tucson, Ariz.; Thomas S. Robinson, Rochester, Minn.

[73] Assignees: International Business Machines Corporation, Armonk, N.Y.; International Business Machines Corporation, Armonk, N.Y.

[21] Appl. No.: 24,905

[22] Filed: Mar. 12, 1987

Related U.S. Application Data

[63] Continuation of Ser. No. 894,732, Aug. 8, 1986, abandoned, which is a continuation of Ser. No. 456,188, Jan. 7, 1983, abandoned.

[51] Int. Cl.$^4$ .............................................. G06K 9/20
[52] U.S. Cl. ......................................... 382/9; 382/48
[58] Field of Search ................... 382/9, 25, 26, 48, 56, 382/45

[56] References Cited

U.S. PATENT DOCUMENTS

| | | | |
|---|---|---|---|
| 3,593,284 | 7/1971 | Frank et al. | 382/66 |
| 3,613,080 | 10/1971 | Angeloni | 382/25 |
| 4,014,000 | 3/1977 | Uno | 382/25 |
| 4,120,049 | 10/1978 | Thaler et al. | 382/9 |
| 4,122,443 | 10/1978 | Thaler et al. | 382/48 |
| 4,155,072 | 5/1979 | Kawa | 382/45 |
| 4,295,121 | 9/1981 | Enser et al. | 382/48 |
| 4,426,731 | 1/1984 | Edlund et al. | 382/48 |
| 4,504,969 | 3/1985 | Suzuki | 382/25 |
| 4,607,385 | 8/1986 | Maeda | 382/9 |

Primary Examiner—Leo H. Boudreau
Attorney, Agent, or Firm—J. Michael Anglin

[57] ABSTRACT

A field of scanned video pels is first broken up into cells representing small portions of characters to be recognized, according to a first set of logics. A second set of logics then recombines the cells into blocks containing individual characters separated from their neighbors.

4 Claims, 10 Drawing Sheets

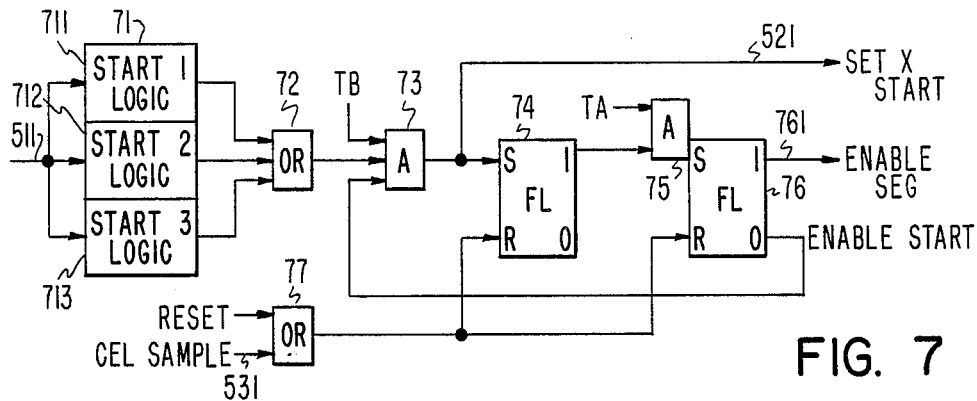
FIG. 7
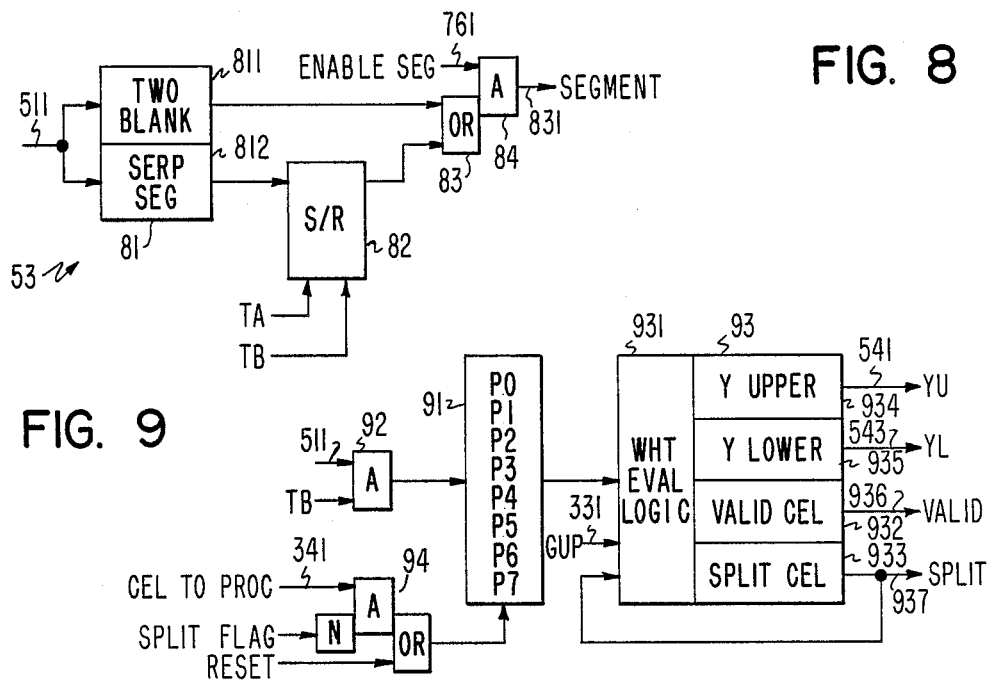
FIG. 8
FIG. 9
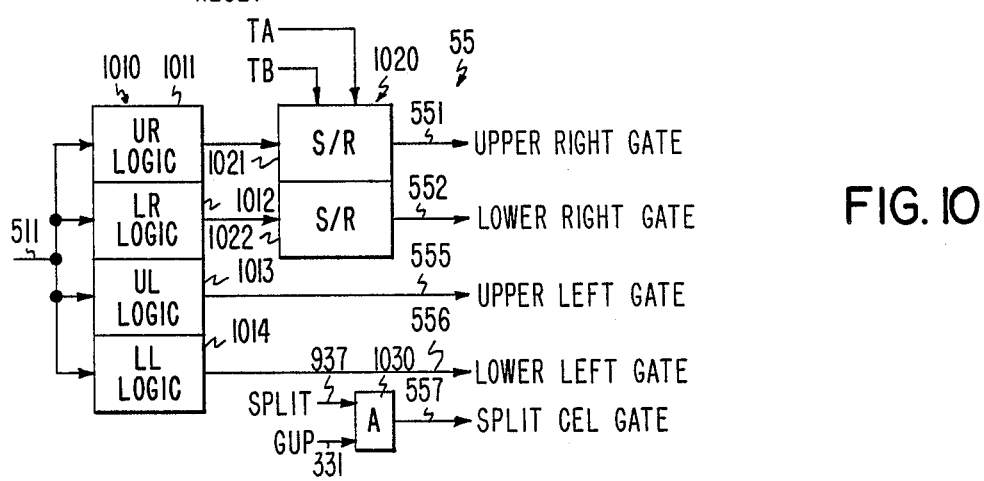
FIG. 10

LOCATING INDIVIDUAL IMAGES IN A FIELD FOR RECOGNITION OR THE LIKE

This is a continuation of co-pending application Ser. No. 894,732 filed on Aug. 8, 1986, now abandoned, which is a continuation of application Ser. No. 456,188, filed on Jan. 7, 1983, now abandoned.

BACKGROUND

The present invention relates to the automatic processing of characters or other images, and more specifically concerns apparatus and methods for locating an individual image and separating it from surrounding images so that the individual image can be processed as a single entity.

Many would agree that the actual recognition of a character or other image is the easy part. The hard part is to turn smudged, skewed, run-together, misaligned patches of ink on a document into well-defined precisely located rectangles which can be said to contain one character to be analyzed. In the words of Charles F. Kettering, "A problem well stated is a problem half solved.". So too, a well-isolated character is already partly recognized.

A large number of approaches have been put forth to locate and separate individual characters on a document. Some are ingenious, and some work quite well. Most of the previous methods involve the determination of a white (i.e., background color) path between every pair of characters: a blank vertical strip, a serpentine boundary, and so forth. This approach is usually called "segmentation". Another group of methods, called "blocking", attempts to isolate image blocks which are easily separable but may contain multiple characters. The blocks are then reduced to individual characters by other means, such as by division into equal-width increments according to a greatest common factor of their varying sizes. All of the previous methods, however, have their drawbacks. Most are quite sensitive to the nature of the particular characters or patterns to be recognized; a good segmentation algorithm for one font may not work for another. Blocking algorithms can be defeated by proportional-spaced characters.

SUMMARY OF THE INVENTION

The present invention opens up a third major approach to the problem of locating and isolating an individual image in a field of images. Rather than locating each image in a single step or by breaking apart larger blocks, the invention first finds small portions of a single image which can be easily isolated. Thereafter, the small portions are recombined with each other to build up the entire image to be located. This process of dividing and reconstructing has several important advantages. It is more general, in that many different kinds of characters and other patterns can be handled without having to devise different sets of segmentation rules. The dividing/reconstructing rules are simpler as well as more general, since they relate to smaller combinations of picture elements (pels). No vertical or other artificial boundaries between adjacent characters need be found; in fact, the area defined for one character can even overlap that for another. The dividing and reconstructing of multiple characters in a line can take place in parallel.

Broadly speaking, the invention locates an individual image in a field of images by first scanning the field into a stream of video elements or pels and interrogating these elements with a set of cell logics, to produce a set of cells each representing only a portion of the one individual image. These cells may be defined by their coordinates and by certain aspects of their video contents. Next, a set of blocking logics combines certain cells with each other to produce a block representing an area containing all of the individual image. The representation of that area, such as a set of document coordinates, selects the particular video elements belonging to that image. The block is preferably produced by combining individual cells with each other, rather than by combining cells with a developing block.

(The term "block" as used in connection with the invention is quite different than the usage of the term "blocking" in one aspect of the prior art, which actually should be called "deblocking". Henceforth, the word "block" will only be used in the sense of the present invention.)

DESCRIPTION OF THE DRAWING

FIG. 7 details the start logic of FIG. 5.

FIG. 8 details the end logic of FIG. 5.

FIG. 9 details the profile logic of FIG. 5.

FIG. 10 details the flag logic of FIG. 5.

DESCRIPTION OF PREFERRED EMBODIMENT

Figure 1:
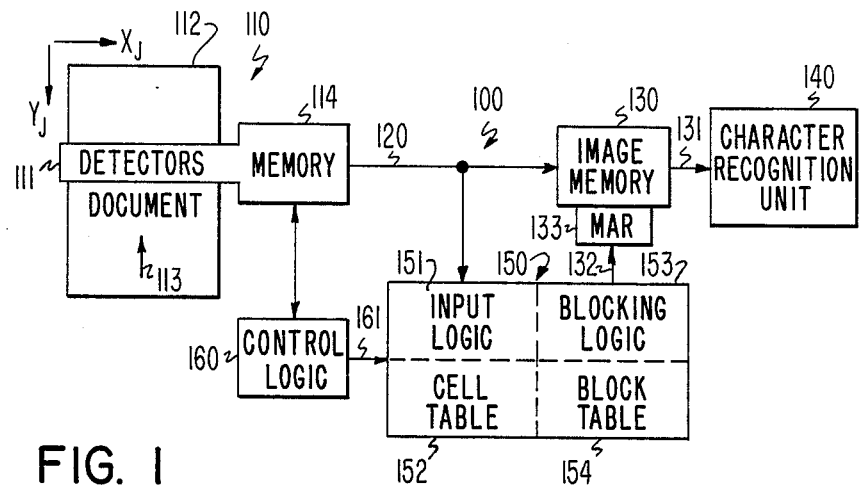
FIG. 1 is a block diagram of a character-recognition system incorporating the present invention.

FIG. 1 is a high-level block diagram of an optical character-recognition (OCR) system 100 capable of carrying out the present invention. Optical scanner 110 includes a line of photo detectors 111 for sensing 2,048 digitized picture elements (pels) in parallel across the width of document 112 as it is transported by any conventional means (not shown) in the direction of arrow 113. Scratch-pad memory 114 reformats the video data from detectors 111, as will be described more fully in connection with FIGS. 2a and 2b. Parallel bus 120 transmits pel data in 8-bit bytes to image buffer memory 130 for temporary storage. Conventional recognition system 140 receives pels for entire images over output bus 131.

The character edge locater unit 150 samples video data on bus 120 to produce coordinates which are then output to memory address register (MAR) 133 to control which bytes in memory 130 are to be output to recognition system 140 as comprising a single image to be interpreted. Unit 150 includes input logic 151 coupled to bus 120 for locating coherent video data collections each representing only a portion (cell) of a single character. The coordinates of these individual portions are stored in a cell table 152. Blocking logic 153 then operates upon the coordinates of these portions to recombine certain portions into blocks each representing an entire character. The coordinates of these blocks are stored in a block table 154, and are then sent via memory address bus 132 to supply MAR 133 with addresses of a single image to be sent to recognition unit 140.

Control logic 160 provides conventional timing and control signals to the other elements of system 100 for synchronization purposes. The signals relevant to the present invention are discussed in connection with FIGS. 3a and 3b.

Figure 2A:
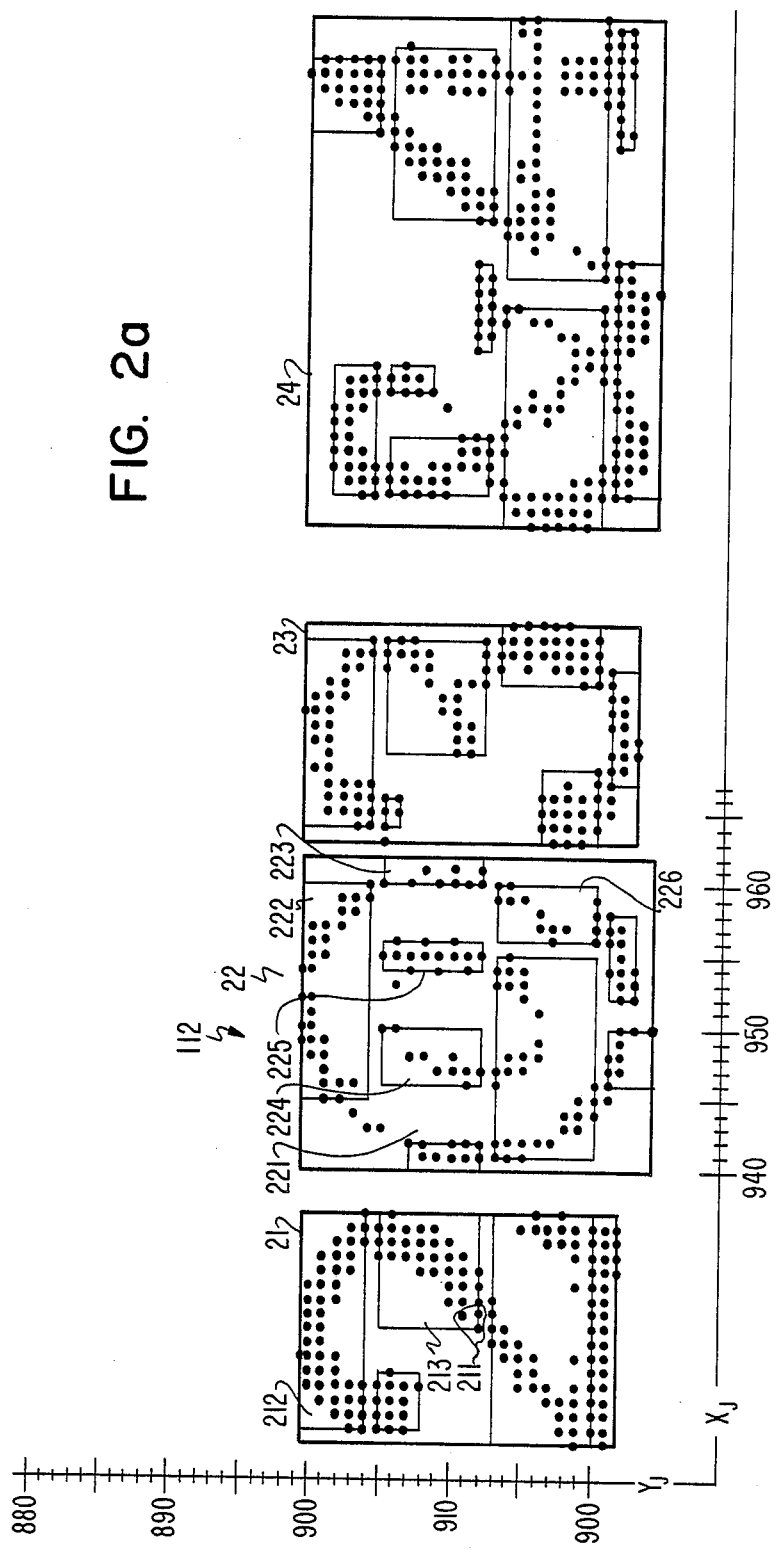
FIGS. 2a and 2b show examples of character images on a document, including cells and blocks found by the invention.
Figure 2B:
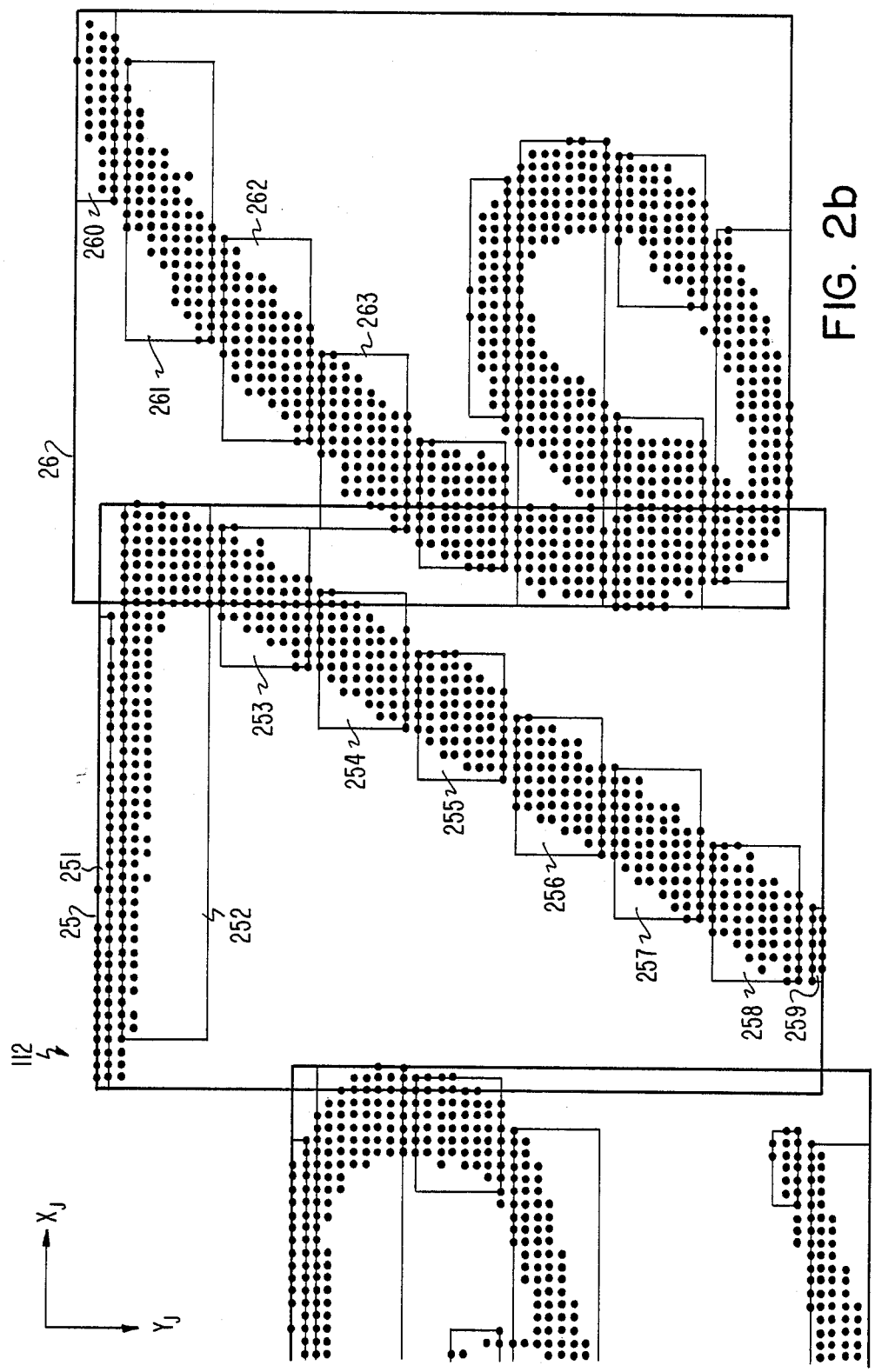

FIGS. 2a and 2b are a representation of the parts of a document 112, and will be used as a running example throughout the description. As shown by the arrows, the coordinate Xj runs horizontally across the document, from Xj=0 at the left edge to Xj=2047 at the right edge. The vertical coordinate Yj runs from the top Yj=0 to the bottom of the document, maximum Yj=4095. The size of one pel for a typical document is a square about 0.004 inch (4 mils, or 0.1 mm) on a side. In the two sample print lines on the document portions shown in FIGS. 2a and 2b, the black dots indicate pels belonging to images or noise. The upper line shows characters 21–24 having a relatively light print density, while the density of characters 25–26 in the lower line represents more of a normal or medium density range. The light-outlined rectangles represent the boundaries of individual cell units representing small portions of characters 21–26. The heavy lines enclose blocks of cells recombined into whole characters.

For purpose of the following description, pel coordinates are identified by the horizontal or X distance from a fiducial point at or near the left edge of document 112, followed by the vertical or Y distance from the same point. Since the document is read by horizontal scans proceeding vertically downward, the Y coordinate can be considered to be a scan number, while X represents a distance from the beginning of that scan. Video data are transmitted over 8-bit-wide (1-byte) bus 120 from 8 scans in parallel, then serially from left to right. That is, the contents of bus 120 at any given bit time represents pels $(X_i, Y_j), (X_i, Y_{j+1}), \ldots, (X_i, Y_{j+7})$; at the following bit time, the contents are $(X_{i+1}, Y_j), (X_{i+1}, Y_{j+1}), \ldots, (X_{i+1}, Y_{j+7})$. After the right end of these scans, i.e., after the byte for i=2047 has been sent, the next 8 scans are sent as a group, beginning with $(X_1, Y_{j+8}), (X_1, Y_{j+9}), \ldots, (X_1, Y_{j+15})$. For this reason, cell heights are limited to 8 bits; they do not extend across groups of 8 scans in the vertical direction. In principle, any maximum height could be used. An 8-scan group as presented on bus 120 is called a scan row.

Figure 3A:
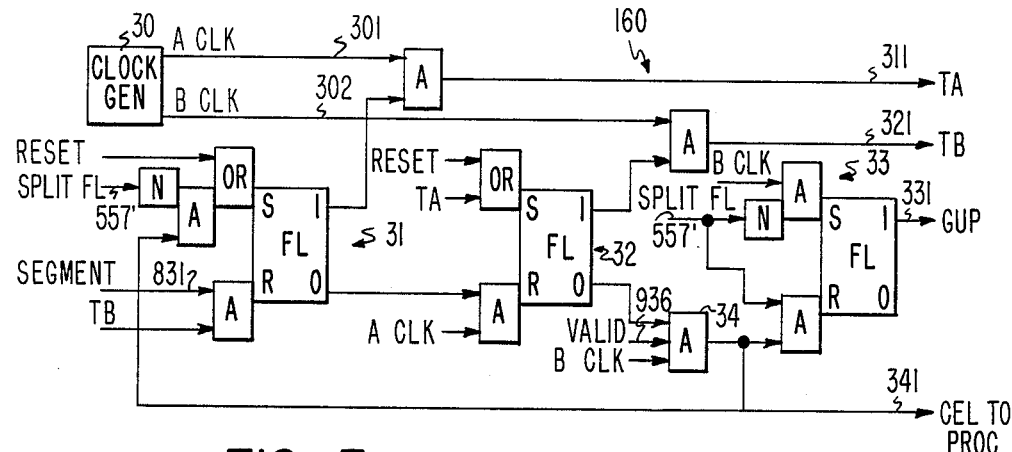
FIGS. 3a and 3b set forth detailed control logic used by the recognition system of FIG. 1.

FIG. 3a shows relevant details of control logic 160, FIG. 1 for synchronizing the operation of various other portions of system 100.

Clock generation circuitry 30 produces continuously running non-overlapping clock signals ACLK 301 and BCLCK 302 from which gating logic 31 and 32 derive gated control clock signals TA 311 and TB 321. Clock signals TA and TB provide the clocking necessary for the operation of the shift registers and counters for determining cell parameters and for synchronizing the remaining control logic. Gating logic 33 generates signal GUP 331 (gate upper) to provide special clocking for a split-cell condition to be described. Normally GUP is on and only the parameters describing one cell are presented to cell tables 152 for each cell ending condition (SEGMENT 831) detected. If the SPLIT condition is indicated by the setting of SPLIT FL 557, two cells must be stored in cell tables 152. GUP will be on for the first (upper) cell of a split cell, and the split condition will also be indicated via SPLIT FL 557. The cell TO PROC signal 341 from gating logic 34 transfers the generated cell parameters to microprocessor RAM 44, FIG. 4. Also, if a split cell is indicated via SPLIT FL 557, the cell TO PROC signal enables the reset of GUP and SPLIT FL 557; this in turn enables the gating of the parameters associated with the lower cell to cell tables 152 in microprocessor RAM 44, via the next occurrence of cell TO PROC. RESET is a conventional system reset signal that returns the system to a known state.

Figure 3B:
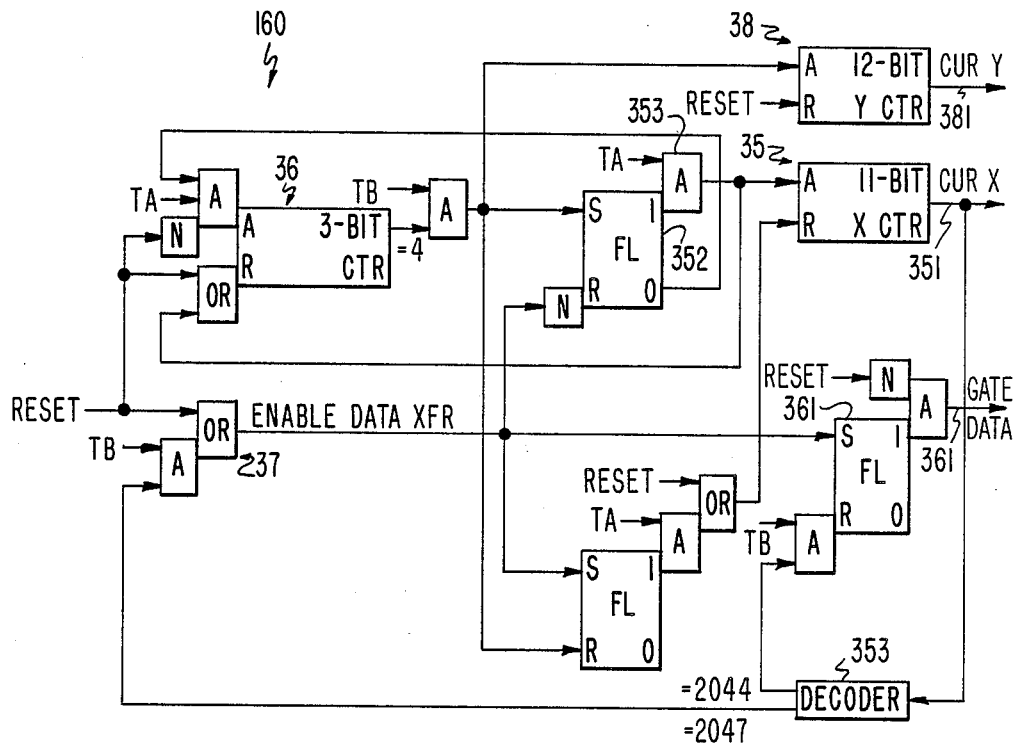

FIG. 3b details that part of control logic 160 for managing the counting of pels to determine the X, Y coordinates of each on document 112.

X counter 35 is an 11-bit (0–2047) counter that provides the running pel X coordinate reference CUR X, 351; it advances one count for each pel increment out of memory 114 in the X direction. X counter 35 advances in synchronization with pel movement through input logic 151. Its value always represents the X position of the current pel group in cell-generate positions C30–C37 of matrix 51, FIG. 6. Three-bit counter 36 provides a 4-scan delay before the X counter enable latch 352 is set, to compensate for the delay in the detection of the cell start and ending conditions from cell generate matrix 51. Latch 352 synchronizes the 4-scan delay and the first increment of X counter 35. Once enabled by latch 352, X counter 35 advances once per TA clock pulse, via AND 353; that is, once for each pel advance. It continues to advance until decoder 353 detects the ending condition X=2047, resetting control latch 352. Logic 36 sends GATE DATA signal 361 to scanner 110, FIG. 1, to enable the transfer of pel data from memory 114 to image memory 130 and to input logic 151. When GATE DATA is active, every TA pulse presents a new group of 8 pels to bus 120. GATE DATA remains active until control latch 362 resets upon the detection of XCTR=2044 by decoder 353, indicating that 2048 8-pel groups have been transferred. X counter 35 continues to advance every TA time until its maximum value of 2047 is detected, indicating that all data for the current group of 8 scans have been processed by input logic 151. Detection of the ending condition causes logic 37 to set ENABLE DATA XFR=0. This in turn resets control latch 352 to allow delay counter 36 to advance, thus starting the process all over again.

Y counter 38 provides CUR Y coordinate 381, representing the high-order 9 bits of the Y coordinate of the current 8 scans. Y counter 38 advances once at the start of processing of the information associated with a group of 8 scans, via the same signal which sets X-enable latch 352. Y counter 38 is a wrap-around counter, and its "R" input forces all positions to a "1" state; thus, the first pulse to its "A" input advances it to the Y=0 state.

Figure 4:
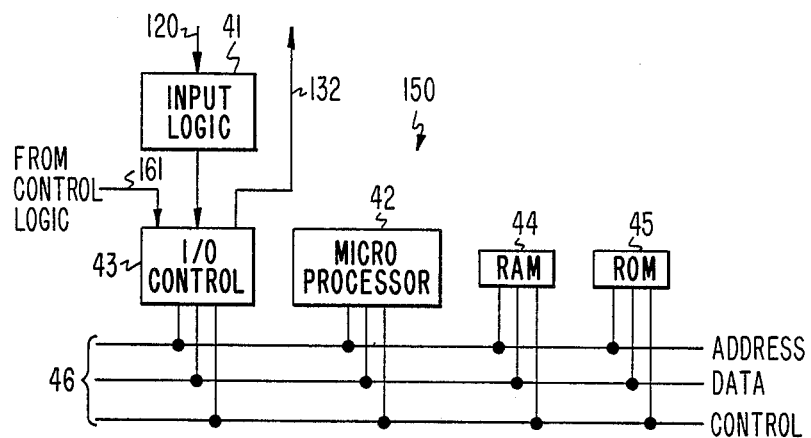
FIG. 4 is a block diagram of the hardware used in the implementation of the invention.

FIG. 4 is an overview of the implementation of locater unit 150 in FIG. 1.

Hardwired random logic 41 samples the video data from bus 120 to perform the input-logic functions 151 of FIG. 1. This form of logic was chosen because of the high speed required to sample the video stream in real time, and because the functions are relatively independent of each other, allowing them to be performed in parallel. FIGS. 5–10 describe the individual logic functions in greater detail.

A conventional microprocessor 42 receives the outputs 411 of logic 41 through conventional parallel input/output (PIO) ports 43, which also handle output data to address bus 132. Random-access read/write memory (RAM) 44 stores cell table 152 and block table 154. Read-only memory (ROM) 45 stores microcode for implementing blocking logic 153 in processor 42. In contrast to input logic 151, the lower speed requirements and more serial nature of logic 153 allow the use of the less expensive microcoded implementation. Logic 153 and the formats of tables 152 and 154 are described more fully in connection with FIGS. 11a–11c. Units 42–45 of FIG. 4 are coupled together via conventional data, address, and control buses 46.

Figure 5:
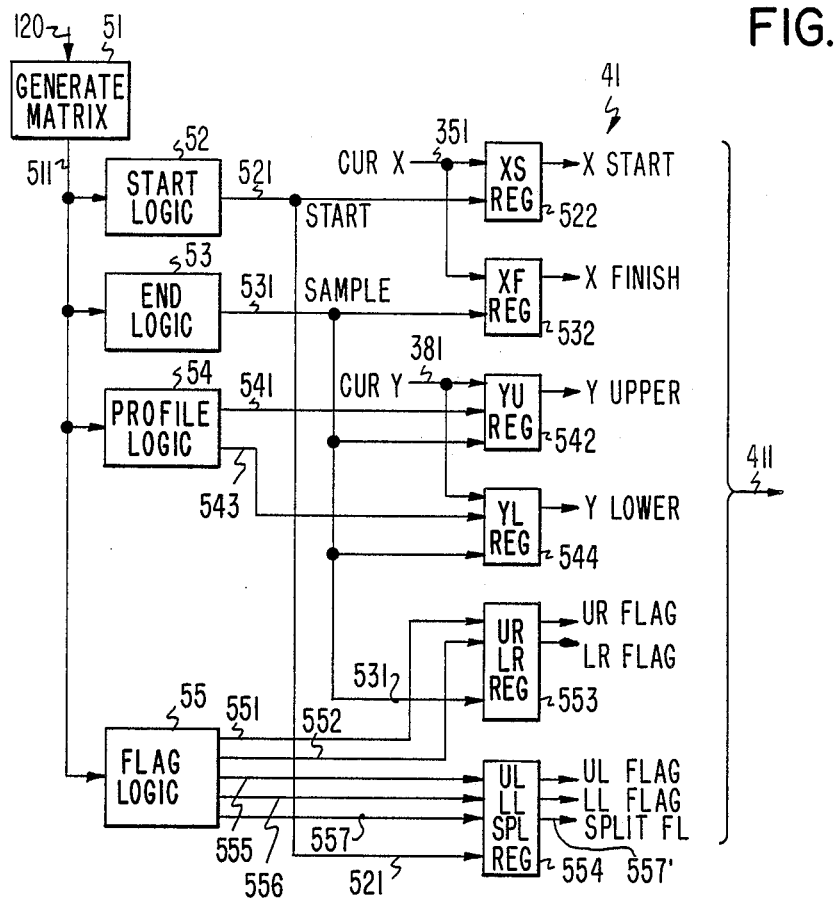
FIG. 5 shows the input logic of FIG. 4.

FIG. 5 is a block diagram of input logic 41. Generate matrix 51, shown in greater detail in FIG. 6, temporarily stores video bits from bus 120 in order to make a larger group of pels available in parallel on bus 511 to other units of input logic 41. Cell start logic 52, expanded in FIG. 7, samples certain pels 511 to produce a START signal 521 indicating the beginning of a new cell. Latch 522 receives X (horizontal) coordinates from counter 35, FIG. 3, and latches the current count as XSTART upon receipt of START signal 521. End logic 53, detailed in FIG. 8, samples other pels 511 to produce a SAMPLE signal 531 indicating the end of the current cell. SAMPLE causes latch 532 to retain the current horizontal pel coordinate from counter 35 as XFINISH on logic bus 411.

Counter 38 keeps the high-order 9 bits of the 12-bit Y (scan or vertical) coordinate. Profile logic 54, detailed in FIG. 8, provides the low-order 3 bits for the upper and lower cell boundaries. Lines 541 provide a 3-bit value for the upper end of a cell within the 8-scan segment supplied by pels 511. Latch 542 captures these 9 high-order and 3 low-order bits, in response to SAMPLE signal 531, as a 12-bit YUPPER address representing the top of the current cell. Lines 543 provide 3 low-order bits for the lower end of a cell within the same 8-scan row. Latch 544, also gated by sample signal 531, stores a 12-bit YLOWER address representing the bottom of the current cell.

Flag logic 55, described more fully in FIG. 10, produces five binary flags indicating various combinations of video bits 511 within the boundaries of the current cell identified by the XSTART, XFINISH, YUPPER and YLOWER addresses. Upper right gate URG flag 551 and lower right gate LRG flag 552 are latched in register 553 by SAMPLE signal 531. Another register 554, latched by XSTART signal 521, holds upper left gate ULG flag 555 and lower left gate LLG flag 556. Register 554 also holds a SPLIT flag 557; this flag indicates the presence of more than one cell within the same 8-scan group monitored by generate logic 51. The latched split-flag output 557' is also used in FIG. 3, as previously described.

Figure 6:
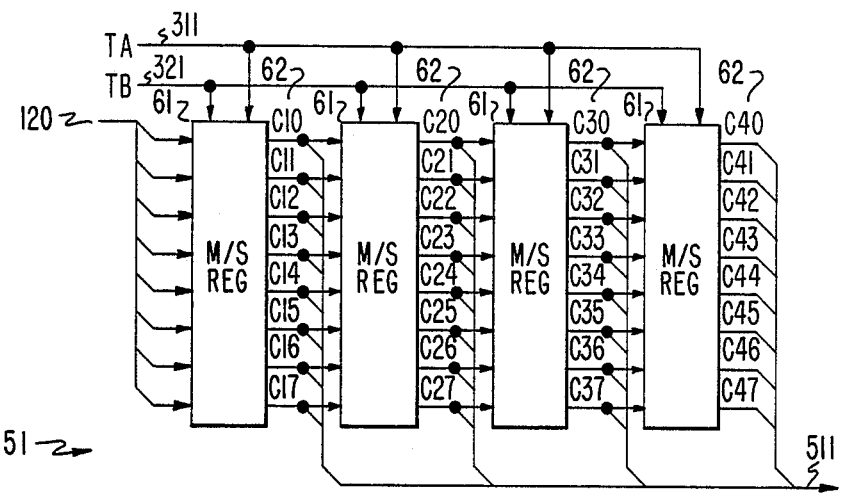
FIG. 6 details the generate matrix of FIG. 5.

FIG. 6 shows generate logic 51 in more detail. An 8-high, 4-wide matrix of master-slave flip-flops 61 (or, equivalently, 8 4-stage shift registers) receives video bits from the current group of 8 scans in parallel. Flip-flops 61 are clocked by two-phase bit-timing signals TA and TB. The 32 bit outputs collectively numbered 62 are brought out to bus 511 to provide a parallel view of 4 pels in the X (horizontal) direction of each of 8 scans in the Y (vertical) direction. Each bit is separately labelled, C10–C47.

FIG. 7 shows start logic 52. Boolean logic 71 samples bits C10–C47 on bus 511 to determine the presence of enough black pels to start a new cell. Logic 711 looks for any 3 black bits in a 2-by-2 bit square, such as the circled bits 211 in character 21, FIG. 2. The formal equation for producing an output from logic 711 is:

$$\text{START 1} = C30 \cdot C40 \cdot (C31+C41) + C31 \cdot C41 \cdot \\ (C30+C40+C32+C42) + C32 \cdot C42 \cdot \\ (C31+C41+C33+C43) + \ldots + C37 \cdot C47 \cdot \\ (C36+C46)$$

Logic 712 looks for any 3 vertically adjacent black bits, viz.:

$$\text{START 2} = (C40 \cdot C41 \cdot C42) + (C41 \cdot C42 \cdot C\rightarrow) + \ldots \\ + (C45 \cdot C46 \cdot C47)$$

Logic 713 finds any 3 horizontally adjacent bits:

$$\text{START 3} = (C20 \cdot C30 \cdot C40) + (C21 \cdot C22 \cdot C23) + \ldots \\ + (C27 \cdot C37 \cdot C47)$$

OR gate 72 combines these three conditions, gating latch 74 via AND 73 at clock phase TB whenever latch 76 is reset. AND 75 samples this signal at the next TA clock phase to set latch 76 to produce an ENABLE SEGMENTATION signal 761 to look for a cell-end condition. OR 77 resets latches 74 and 76 upon a RESET signal or a cell SAMPLE signal 531. XSTART output is taken from the output of AND 73.

End logic 53, FIG. 8 examines the video bits on lines 511 to determine the X coordinate at which a cell, having been started by logic 52, should be terminated for lack of further connected black video. Although any of a number of conventional segmentation techniques could be used in this setting, two relatively straightforward algorithms have been chosen. Boolean logic 811 contains a random-logic network 81 for detecting two adjacent blank (i.e., white) vertical columns, according to the equation:

$$\text{2BLANK} = \overline{C20} \cdot \overline{C30} \cdot \overline{C21} \cdot \overline{C31} \ldots \overline{C27} \cdot \overline{C37}$$

(An underbar in this and other equations indicates a logical inverse or "not" function.)

The pels in region 221, FIG. 2a, represent this type of segmentation. Another random-logic network 812 detects a serpentine path of two blank pels between black video. The complete equation for network 812 is:

$$\begin{aligned}\text{SERP} = &\ ((\overline{C10} \cdot \overline{C11} \cdot \overline{C20} \cdot \overline{C21}) + (\overline{C20} \cdot \overline{C21} \cdot \overline{C30} \cdot \overline{C31}) + \\ &\ (\overline{C30} \cdot \overline{C31} \cdot \overline{C40} \cdot \overline{C41})) \cdot \\ &\ ((\overline{C11} \cdot \overline{C12} \cdot \overline{C21} \cdot \overline{C22}) + (\overline{C21} \cdot \overline{C22} \cdot \overline{C31} \cdot \overline{C32}) + \\ &\ (\overline{C31} \cdot \overline{C32} \cdot \overline{C41} \cdot \overline{C42})) \cdot \\ &\ ((\overline{C12} \cdot \overline{C13} \cdot \overline{C22} \cdot \overline{C23}) + (\overline{C22} \cdot \overline{C23} \cdot \overline{C32} \cdot \overline{C33}) + \\ &\ (\overline{C32} \cdot \overline{C33} \cdot \overline{C42} \cdot \overline{C43})) \cdot \\ &\ ((\overline{C13} \cdot \overline{C14} \cdot \overline{C23} \cdot \overline{C24}) + (\overline{C23} \cdot \overline{C24} \cdot \overline{C33} \cdot \overline{C34}) + \\ &\ (\overline{C33} \cdot \overline{C34} \cdot \overline{C43} \cdot \overline{C44})) \cdot \\ &\ ((\overline{C14} \cdot \overline{C15} \cdot \overline{C24} \cdot \overline{C25}) + (\overline{C24} \cdot \overline{C25} \cdot \overline{C34} \cdot \overline{C35}) + \\ &\ (\overline{C34} \cdot \overline{C35} \cdot \overline{C44} \cdot \overline{C45})) \cdot \\ &\ ((\overline{C15} \cdot \overline{C16} \cdot \overline{C25} \cdot \overline{C26}) + (\overline{C25} \cdot \overline{C26} \cdot \overline{C35} \cdot \overline{C36}) + \\ &\ (\overline{C35} \cdot \overline{C36} \cdot \overline{C45} \cdot \overline{C46})) \cdot \\ &\ ((\overline{C16} \cdot \overline{C17} \cdot \overline{C26} \cdot \overline{C27}) + (\overline{C26} \cdot \overline{C27} \cdot \overline{C36} \cdot \overline{C37}) + \\ &\ (\overline{C36} \cdot \overline{C37} \cdot \overline{C46} \cdot \overline{C47}))\end{aligned}$$

The region 222, FIG. 2a, represents a serpentine segmentation between two cells. One-bit shift register 82, clocked by phases TA and TB, delay the serpentine segmentation signal SERP for proper synchronization with blank-column logic 811. Then the two segmentation signals are combined in OR 83 and sent out through AND 84 under the control of enabling signal 761 from FIG. 7 as SEGMENT signal 831.

Profile logic 54, FIG. 9, is built around an 8-bit-high profile register 91. Once every bit time, TB gates one column of video data C30–C37 through ANDs 92, where each bit is ORed with the bits already present in the corresponding register positions P0–P7. That is, register 91 presents an "edge-on" view of a cell, wherein black video at any vertical position in the current 8 scans is accumulated. Profile-evaluation matrix 93 contains Boolean combinatorial logic for determining the vertical boundary addresses of the current cell, and for detecting the presence of split cells within the current group of 8 scans. White-evaluation logic 931 finds 3-bit-high white strips in register 91; these functions W0–W5 in logic 931 are used in the other portions of logic 93.

$$W0 = \overline{P0 \cdot P1 \cdot P2} \quad W3 = \overline{P3 \cdot P4 \cdot P5}$$
$$W1 = \overline{P1 \cdot P2 \cdot P3} \quad W4 = \overline{P4 \cdot P5 \cdot P6}$$
$$W2 = \overline{P2 \cdot P3 \cdot P4} \quad W5 = \overline{P5 \cdot P6 \cdot P7}$$

Valid-cell logic 932 uses the Wn and Pn signals to produce VALID signal 936 according to the following equation.

$$VALID = P0 + (P1.\overline{W2}) + (P2.\overline{W3}) + (P3.\overline{W4}) + (P4.\overline{W1}) + (P5.\overline{W2}) + (P6.\overline{W3}) + P7$$

VALID is a minimum character requirement; it asserts that there is more black video in the cell than that due to random smudges.

Split-cell logic 933 detects the presence of two black profiles separated by a white space in register 91. The split-cell capability makes the cell less position-dependent in the vertical direction. It also enables the vertical segmentation of characters or images in close vertical proximity to each other. An example of its usefulness is the vertical segmentation of closely spaced character lines when a lower case "g" is encountered directly above an upper case "T". The equation for this condition is:

$$\begin{aligned}SPLIT = \ &W1 \cdot W2 \cdot W3 \cdot W4 \cdot P0 \cdot P7 + W1 \cdot P0 \cdot P7 + W1 \cdot P0 \cdot \\&(P5 \cdot P6 + P4 \cdot P6) + W2 \cdot P0 \cdot (P5 \cdot P6 + P7) + \\&W3 \cdot P0 \cdot P7 + W3 \cdot P7 \cdot P1 \cdot P2 + W4 \cdot P0 \cdot P7 + W4 \cdot P7 \cdot \\&(P1 \cdot P2 + P2 \cdot P3 + P1 \cdot P3)\end{aligned}$$

Upper-boundary logic 934 produces the low-order 3 bits YU 541 of the address of the top of the current cell within the current group of 8 scans. Logic 934 responds to the Pn and Wn signals, and also to SPLIT signal 937 and GUP 331 (from FIGS. 3a and 3b), since two upper boundaries must be transmitted when SPLIT indicates two cells within the same group of scans. The table below shows the conditions under which each of the binary addresses 000–111 is generated at YU. (Vertical addresses increase downwardly on document 112.)

| Upper Address | Condition |
|---|---|
| 000 | $\overline{SPLIT} \cdot P0 + SPLIT \cdot GUP \cdot P0$ |
| 001 | $\overline{SPLIT} \cdot \overline{P0} \cdot P1 \cdot \underline{W2} + SPLIT \cdot GUP \cdot \underline{P0} \cdot P1$ |
| 010 | $\overline{SPLIT} \cdot \overline{P0} \cdot \overline{P1} \cdot P2 \cdot W3 + SPLIT \cdot GUP \cdot \underline{P0} \cdot \underline{P1} \cdot P2$ |
| 011 | $\overline{SPLIT} \cdot P3 \cdot W0 \cdot \underline{W4}$ |
| 100 | $\overline{SPLIT} \cdot P4 \cdot W1 \cdot \underline{W5} + SPLIT \cdot \underline{GUP} \cdot P4$ |
| 101 | $\overline{SPLIT} \cdot P5 \cdot \overline{(P6+P7)} \cdot W2 + SPLIT \cdot \underline{GUP} \cdot \underline{P4} \cdot P5$ |
| 110 | $\overline{SPLIT} \cdot P6 \cdot \overline{P7} \cdot W3 + SPLIT \cdot \underline{GUP} \cdot \underline{P4} \cdot \underline{P5} \cdot P6$ |
| 111 | $\overline{SPLIT} \cdot P7 \cdot W4 + SPLIT \cdot \underline{GUP} \cdot \underline{P7} \cdot W4$ |

Lower-boundary logic 935 similarly produces the low-order 3 bits YL 543 of the address of the current cell. (Since YL and YU both occur in the same 8-scan group, the upper 9 bits of their addresses are the same.) Logic 935 responds to Pn, Wn, SPLIT and GUP as indicated in the following table.

| Lower Address | Condition |
|---|---|
| 000 | $\overline{SPLIT} \cdot \overline{P0} \cdot W1 \cdot W2 \cdot W3 \cdot W4 + SPLIT \cdot GUP \cdot \overline{P0} \cdot W1$ |
| 001 | $\overline{SPLIT} \cdot P0 \cdot P1 \cdot W2 + SPLIT \cdot GUP \cdot P1 \cdot \underline{P2} \cdot \underline{P3}$ |
| 010 | $\overline{SPLIT} \cdot (P0+P1) \cdot P2 \cdot W3 + SPLIT \cdot GUP \cdot P2 \cdot \underline{P3}$ |
| 011 | $\overline{SPLIT} \cdot P3 \cdot \underline{W0} \cdot W4 + SPLIT \cdot GUP \cdot P3$ |
| 100 | $\overline{SPLIT} \cdot P4 \cdot \underline{W1} \cdot W5$ |
| 101 | $\overline{SPLIT} \cdot P5 \cdot \underline{P6} \cdot \underline{P7} \cdot W2 + SPLIT \cdot \underline{GUP} \cdot P5 \cdot \underline{P6} \cdot \underline{P7}$ |
| 110 | $\overline{SPLIT} \cdot P6 \cdot \underline{P7} \cdot W3 + SPLIT \cdot \underline{GUP} \cdot P6 \cdot \underline{P7}$ |
| 111 | $\overline{SPLIT} \cdot P7 + SPLIT \cdot \underline{GUP} \cdot P7$ |

Profile reset logic 94 clears register 91 for the next cell. The system RESET signal is effective by itself. Otherwise cell-TO-PROCESSOR signal 341 is ANDed with the inverted split flag at the end of the current cell.

FIG. 10 describes flag logic 55 for generating the flag bits for indicating the video contents of the current cell. Corner logics 1010 examine video bits 511 for white video in each corner of the current cell; more specifically, a flag is set if a 4-by-4 bit triangular area in the corresponding corner consists entirely of white pels. Upper-right logic 1011 produces the flag or gate bit URG 551 by means of the following Boolean function.

$$URG = \overline{C10.C20.C30.C40.C11.C21.C31.C12.C22.C13}$$

Lower-right logic 1012 produces flag bit LRG 551 as follows.

$$LRG = \overline{C17.C27.C37.C47.C16.C26.C36.C15.C25.C14}$$

Upper-left logic 1013 functions similarly.

$$ULG = \overline{C10.C20.C30.C40.C21.C31.C41.C32.C42.C43}$$

Lower-left logic 1014 has the following form.

$$LLG = \overline{C17.C27.C37.C47.C26.C36.C46.C35.C45.C44}$$

Referring back to FIG. 5, the right-side flags URG 551 and LRG 552 are latched by SAMPLE at the end of the cell, while left-side flags ULG 555 and LLG 556 are latched by XSTART at the beginning. To provide both sets of flag bits at the same time, the right-side flags are delayed in 3-bit shift registers 1021 and 1022, FIG. 10. The split-cell flag or gate 557 is derived from the SPLIT signal of FIG. 9 by AND 1030 with gate-upper cell signal GUP 331 from FIG. 3. That is, gate 557 is inactive for a split cell only when the upper portion is being gated out.

Figure 11A:
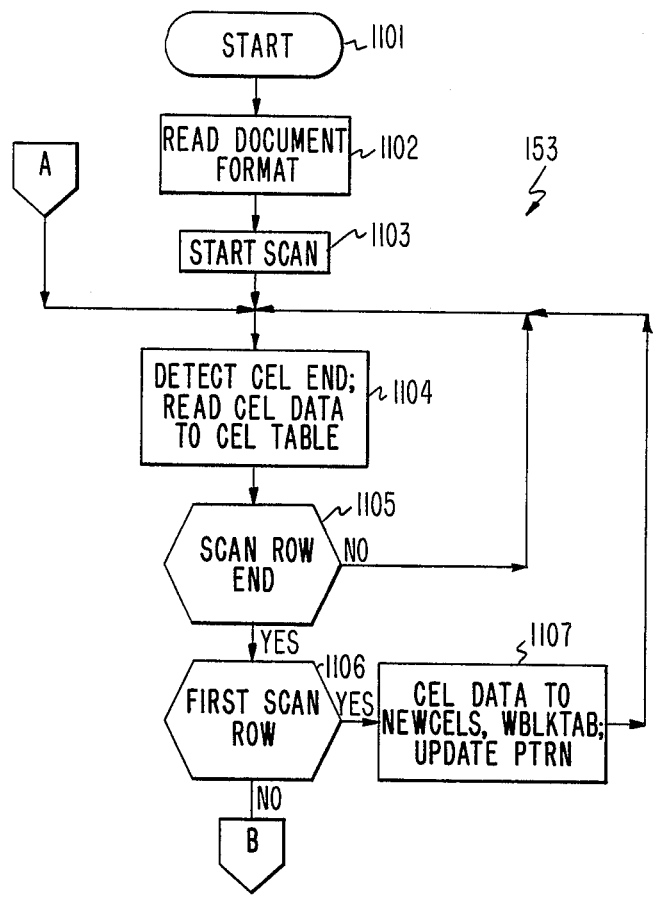
FIGS. 11a, 11b, and 11c show a flow chart of blocking logic according to the invention.
Figure 11B:
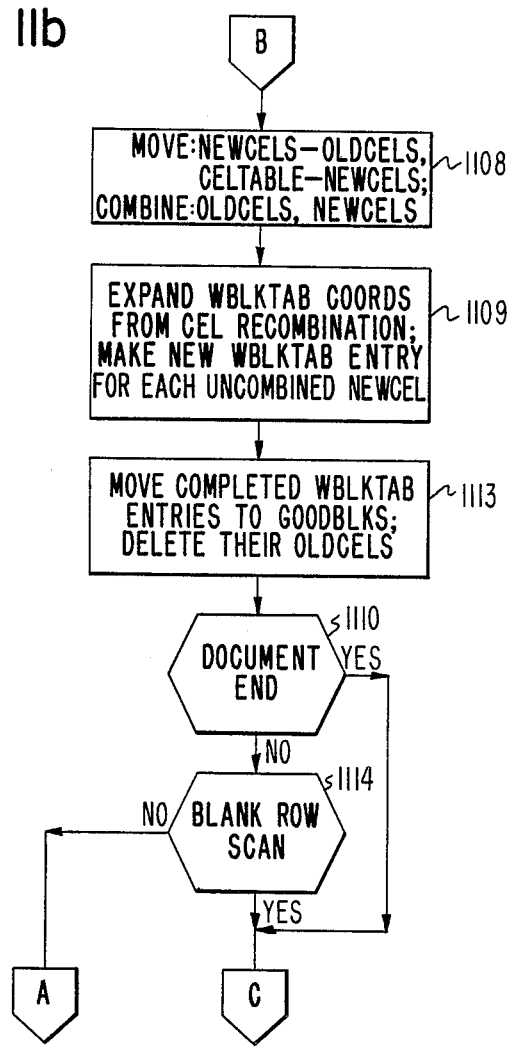
Figure 11C:
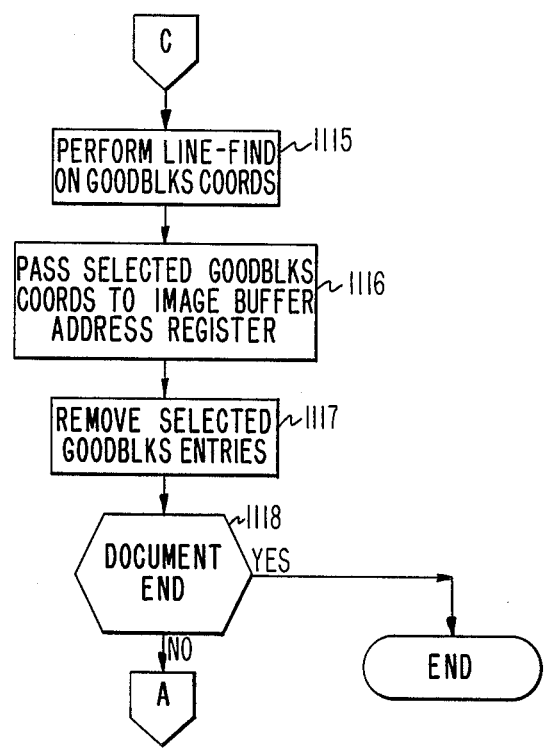

FIGS. 11a, 11b and 11c are a flow chart of the cell blocking logic 153 (FIG. 1), which is physically located in ROM 45 (FIG. 4). The overall function of the blocking logic is to combine individual cells, produced by input logic 151 and stored in cell table 152, into larger blocks representing entire characters. The combination depends upon the locations of the cells relative to each other, and upon the video content of the cells and their neighbors. The coordinates of these combined blocks are then stored in block table 154 and transferred to MAR 133 so as to cause whole characters to be transferred to recognition unit 140 for analysis. The blocking logic can also perform a conventional line-finding function, in which entire lines of characters are tracked to compensate for skew or other nonuniformities.

The blocking logic uses the following data structures, all stored in RAM 44, FIG. 4. The first structive, CELTAB, contains entries in table 152, FIG. 1; the GOODBLKS entries comprise block table 154. The other structures are intermediate data.

CELTAB (cell table) contains the cell coordinates generated by the cell logic hardware 41, FIG. 5. A horizontal start XS, horizontal finish XF, vertical upper YU, vertical lower YL and a flag byte FL describing the video comprising one cell entry in the CELTAB. Each entry has the following format:

| XS | XF | YU | YL | FL |
|----|----|----|----|----|

OLDCELS (old cells) Each entry contains one complete 8-bit-high scan row of cells. OLDCELS contain either the first row scan or the previous row scan of cells. The format of each entry is the same as that of CELTAB, but also includes a pointer PTRO to the WBLKTAB entry of which the cell is a part.

| XSO | XFO | YUO | YLO | FLO | PTRO |
|-----|-----|-----|-----|-----|------|

NEWCELS (new cells) contain one complete 8-bit-high scan row of cells. NEWCELS contain the current scan row of cells. The entry format is the same as that of CELTAB, with the addition of a pointer PTRN to the WBLKTAB block with which the cell has been combined.

| XSN | XFN | YUN | YLN | FLN | PTRN |
|-----|-----|-----|-----|-----|------|

WBLKTAB (work block table) contains the cumulative results of blocking or combination of OLDCELS and NEWCELS values. The values are X start, X final, Y upper, Y lower, and forward and backward chain addresses pointing to the previous and next block in the WBLKTAB. Also, a leg counter indicates when no more cells have been added into a block in the WBLKTAB. The entry format is:

| XSWB | XFWB | YUWB | YLWB | PASTBLK | NEXTBLK | LEGCTR |
|------|------|------|------|---------|---------|--------|

GOODBLKS table entries contain the X and Y coordinates of video to be selected by the microprocessor in image memory 130, FIG. 1 and sent to recognition unit 140. The X start/finish and Y upper/lower corners of these good blocks are formatted thus:

| XSBG | XFBG | YUBG | YLBG |
|------|------|------|------|

After starting at 1101, FIG. 11, blocking logic 153 may first, at 1102, optionally obtain from some external interface (not shown) a description or format of the document 112. Such a description is conventional to specify particular document areas to be scanned and analyzed, to specify fonts and nominal sizes of characters to be recognized, and so forth. Starting the document scan at 1103 activates input logic 41, FIG. 4, to begin identifying cells. When the end of any cell is detected by interrupt 341, FIG. 3a, at 1104, microprocessor 42 transfers the data for that cell from lines 411 through I/O ports 43 into CELTAB 152 in RAM 44. Step 1104 is repeated for further cells until block 1105 detects the end of the current group of 8 scan lines. If the current group was the first group in the document, there are no pre-existing entries in NEWCELS, OLDCELS, and WBLKTAB. Step 1106 then enables step 1107, which moves the current CELTAB entries to NEWCELS and WBLKTAB, and updates the PTRN pointer of NEWCELS to point to the corresponding entry in WBLKTAB. The procedure then returns to detect more cells until 1105 detects the "end of scan row" condition. That is, no blocking or recombination occurs during the first scan group. For the second and subsequent scan groups, as detected by 1106, step 1108 moves the current NEWCELS work entries to the OLDCELS work area. The CELTAB entries are then moved to the NEWCELS work area to allow possible combination with the cells in the previous scan group that are now stored in OLDCELS.

A valid combination in step 1108 of an OLDCELS entry with a NEWCELS entry produces an expanded set of X and Y coordinates representing a rectangle including both cells. Each OLDCELS entry has a corresponding WBLKTAB entry identified by pointer PTRO. NEWCELS entries are compared with OLDCELS entries to determine if they satisfy the recombination criteria. If a NEWCELS entry is found to combine with an OLDCELS entry, the OLDCELS corresponding WBLKTAB entries X and Y coordinates XSWB, XFWB, YUWB, YLWB are expanded to include the coordinates of the NEWCELS entry. The NEWCELS pointer PTRN is also updated to point to the updated WBLKTAB entry. Cell recombination is determined at the CELTAB level and not at the WBLKTAB level. That is, recombination occurs between cells of similar size, rather than between small cells and larger blocks. This significant feature of the invention ensures that each added increment has a good local fit with its neighbors, not merely a vague general proximity to a larger heterogeneous blob.

Step 1109 then attempts to include this combination. If a NEWCELS entry does not combine in with an existing OLDCELS entry, the NEWCELS entry is the start of a new block; a WBLKTAB entry is formed that has X and Y coordinates equal to those of the NEWCELS, and the PTRN pointer from the NEWCELS is updated to point to the new WBLKTAB entry. In step 1113, OLDCELS entries found not to combine with NEWCELS identify completed WBLKTAB entries. These entries are then moved to the GOODBLKS table, and their corresponding OLDCELS entries are deleted. Decision block 1110 tests for the end-of-document condition by comparing the present value of Y counter 38, FIG. 3b, with the maximum value from the document format information presented in block 1102. If the end of the document has been reached, processing continues with step 1115; otherwise step 1114 is performed.

Step 1109 combines horizontally overlapping cells according to the flag bytes of the candidates. In terms of the previously described OLDCELS and NEWCELS entries, the recombination requirements are: YUN−YLO≦2, XFN−XSO≧T1, and XFO−XSN≧T2. Thresholds T1 and T2 are determined via the flag conditions as shown in the following table.

| FLAG CONDITIONS | | |
| --- | --- | --- |
| OLDCELS | NEWCELS | THRESHOLDS |
| LL = 0 | UR = 0 | T1 = 0 |
| LL = 0 | UR = 1 | T1 = 1 |
| LL = 1 | UR = 0 | T1 = 1 |
| LL = 1 | UR = 1 | T1 = 2 |
| LR = 0 | UL = 0 | T2 = 0 |
| LR = 0 | UL = 1 | T2 = 1 |
| LR = 1 | UL = 0 | T2 = 1 |
| LR = 1 | UL = 1 | T2 = 2 |

Character 22, FIG. 2a, illustrates the adjacency requirements for cell recombination. The parameters associated with cell 223 in NEWCELS are compared with those of cell 222 in OLDCELS to determine if their combination should be included as part of the developing block 25 in WBLKTAB. For this comparison, the flag conditions are OLDCEL LL=∅, OLDCEL LR=∅, NEWCEL UL=∅, and NEWCEL UR=∅. Thresholds T1 and T2 are thus both zero. The two cells combine together because all recombination conditions are satisfied:

XFN−XS0≧T1 becomes 962−945≧0;

XF0−XSN≧T2 becomes 960−960≧0;

YUN−YLO≦2 becomes 905−904≦2.

In like manner, the parameters associated with cell 226 in NEWCELS are compared with those of cell 225 in OLDCELS for possible recombination into block 22 in WBLKTAB. For this comparison, the flag conditions are OLDCEL LL=∅, OLDCEL LR=∅, NEWCEL UL=1, and NEWCEL UR=∅. From the flag conditions above, T1=∅ and T2=1. The two cells are found not to combine because one of the required recombination conditions is not satisfied: XFO−XSN T2 becomes the false statement 956−956 1.

XFN−XS0≧T1 (satisfied)

XF0−XSN≧T2 (not satisfied)

YUN−YLO≦2 (satisfied)

But, even though cell 226 does not combine with cell 225, it does combine with cell 223 (and thus combines into block 22) when its parameters are compared with the parameters of cell 223 at a later point in the scans. That is, a cell might possibly recombine into a character block at any one of several locations, each with a different partner.

When the current group of scans are entirely blank, logic test 1114 passes control to a line-finding procedure 1115. Line-find logic 1115 is an auxiliary function which tracks skewed and misaligned character lines on the document, using the completed cell blocks contained in GOODBLKS. It will be described in greater detail in connection with FIG. 12.

Logic 1116 then passes the GOODBLKS coordinates selected by line-finding procedure 1115 to MAR 133, FIG. 1 as a series of addresses specifying which data bytes in memory 130 are to be sent to recognition unit 140. Finally, the selected GOODBLKS entries are cleared at 1117, in preparation for a new line of characters. If the blank scans also represent the end of the document, as previously described for decision block 1110, test 1118 ends the blocking procedure. Otherwise, control is returned to block 1104, FIG. 11A.

Character 25, FIG. 2a, provides an overall example of the recombination of cells into blocks. If the end of the current scan row has not been reached (block 1105, FIG. 11), any further cells are moved to NEWCELS, after the previous NEWCELS contents have been moved to OLDCELS. In the character "7" (marked with reference numeral 25), cell 251 resides in OLDCELS after two row scans, while cell 252 is in NEWCELS. The logic for determining whether cells can be combined is based upon proximity to the previous cell (located in OLDCELS) above the NEWCELS, rather than being conditioned upon the block being built in WBLKTAB. This allows overlapping characters such as 25 and 26 to be placed into separate blocks. Cells 251 and 252 are actually combined by storing an entry in WBLKTAB which contains the horizontal starting address XS and the upper address YU of cell 251, but the horizontal finish address XF and lower address YL of cell 252.

At this time, cells 251 and 252 reside in OLDCELS and NEWCELS respectively, while a block representing the combined extent of both cells resides in WBLKTAB. In the next scan row, cell 253 expands only the lower coordinate YL of the current WBLKTAB in block 1116, since the horizontal XS and XF addresses already extend beyond the boundaries of cell 253. Blocking continues for cells 254–259. Since these cells also lie within the horizontal extent of cells 251–252, the XS and XF coordinates for character 25 remain constant, as shown pictorially by the heavy outline. The blank scans following cell 259 terminate the combination process, establishing the final lower boundary YL for the WBLKTAB entry for character 25.

Note that blocks (characters) 25 and 26 are processed in parallel, one scan row at a time. Upon the completion of processing, the boundaries for two distinct but overlapping characters 25 and 26 are defined.

Figure 12:
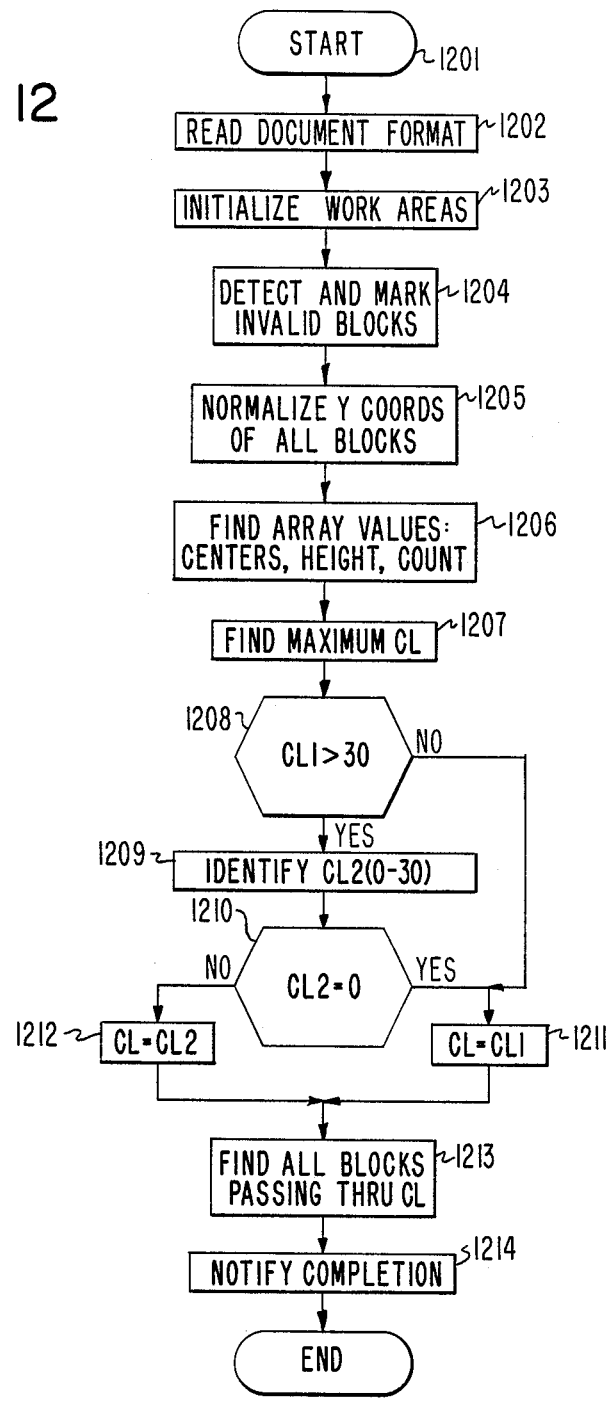
FIG. 12 details the line-finding procedure used in FIGS. 11a, 11b and 11c.

FIG. 12 shows a conventional line-finding procedure 1115 in greater detail. This procedure is optional, and is not required to practice the invention. It discriminates between a line of character images and noise above and below the line; it also tracks lines which are skewed (not exactly horizontal) on the document, by generating and following a centerline.

After starting at block 1201, the procedure obtains from 1102, FIG. 11, a description of a particular area of document 112, containing, e.g., the size and style of printing expected. After certain work areas are initialized at 1203, step 1204 checks all blocks in the GOODBLKS table for appropriate size to be valid characters. Invalid blocks are marked by any convenient means, such as by making their XS coordinates negative. The line-find algorithm described here works on an area that is 64 scans (pels) high using a 64-position working array called CENTERS. Step 1205 then logically normalizes all valid blocks in the area to the top of the area. In FIG. 2A the top of the area is Y=00881; thus to perform the normalization step, 00881 would be subtracted from each GOODBLKS YU and YL entry.

Step 1206 generates the line-find array (CENTERS) values. The centerline of each block is calculated and normalized with respect to the top of the area. In FIG. 2A the block centerlines are as follows:

Block 21=20

Block 22=21

Block 23=20

Block 24=21

The CENTERS array is generated by summing the block widths (XF−XS+1) for each block that shares the same centerline position. In the example given in FIG. 2A, the widths of blocks 21 and 23 are summed to provide entry CENTERS(20) and blocks 22 and 24 are summed to provide entry CENTERS(21). All other positions in the CENTERS array are set to zero. For the example in FIG. 2A, at the completion of steps 1206 the array values would be:

CENTERS(20)=33

CENTERS(21)=59

Step 1207 finds the maximum of the CENTERS values (21 in FIG. 2A) and compares it in steps 1208 with a control value 30. If the maximum centerline is 30, the center line will be used in step 1213 to collect all blocks in the area that intersect the centerline; that is, those GOODBLKS entries whose YU coordinates lie above the centerline and whose YL coordinates lie below it. Finally, step 1214 completes the processing for the line thus found. The identified blocks are analyzed to check for abnormalities. Block 24, FIG. 2a, e.g., is much wider than blocks 21, 22 and 23; it would be identified as requiring a further segmentation step. The control program is then notified that the line find process has completed.

If step 1208 determines that the maximum centerline is 30, it is possible that more than one line of characters are present; step 1209 searches the CENTERS array to determine if there is an array position 30 having a non-zero value. If one is found, step 1210 causes step 1212 to use the new maximum centerline for the search procedure in step 1213; otherwise, step 1211 selects the original centerline. Control ultimately passes to step 1214 as described above.

We claim as our invention:

1. A method for developing boundaries of an area containing an individual character in a field containing multiple characters so as to isolate said individual character to facilitate recognition thereof by character recognition means, comprising:

(a) scanning said field to produce a stream of video elements representing said character field;
   (b) interrogating said video elements with a first set of logics to locate coherent video elements and produce therefrom a plurality of boundary coordinate designations defining a plurality of rectangular cells, each of which represents only a relatively small portion of individual characters of said characters, said first set of logics includes logics for determining vertical starting and ending coordinates for two cells based upon a split profile in said video elements resulting from scanning said field;
   (c) interrogating said plurality of boundary coordinate designations defining a plurality of rectangular cells with a second set of logics to produce a set of boundary coordinate designations for a block representing an area containing only said individual character by combining only related rectangular cells; and
   (d) outputting said set of boundary coordinate designations for said block so as to enable said character recognition means to select certain of said video elements as belonging to said individual character.

2. A method for developing boundaries of an area containing an individual character in a field containing multiple characters so as to isolate said individual character to facilitate recognition thereof by character recognition means, comprising:

(a) scanning said field to produce a stream of video elements representing said character field;
   (b) interrogating said video elements with a first set of logics to locate coherent video elements and produce therefrom a plurality of boundary coordinate designations defining a plurality of rectangular cells, each of said cells includes flags denoting predetermined combinations of said video elements near a plurality of corners of one of said cells,
   (c) interrogating said plurality of boundary coordinate designations defining a plurality of rectangular cells with a second set of logics to produce a set of boundary coordinate designations for a block representing an area containing only said individual character by combining only related rectangular cells; and
   (d) outputting said set of boundary coordinate designations for said block so as to enable said character recognition means to select certain of said video elements as belonging to said individual character.

3. A method for developing boundaries of an area containing an individual character in a field containing multiple characters so as to isolate said individual character to facilitate recognition thereof by character recognition means, comprising:

(a) scanning said field to produce a stream of video elements representing said character field;
   (b) interrogating said video elements with a first set of logics to locate coherent video elements and produce therefrom a plurality of boundary coordinate designations defining a plurality of rectangular cells, each of which represents only a relatively small portion of individual characters of said characters;

(c) interrogating said plurality of boundary coordinate designations defining a plurality of rectangular cells with a second set of logics to produce a set of boundary coordinate designations for a block representing an area containing only said individual character by expanding a set of coordinates defining boundaries of said block whenever said second set of logics combines said cells, said second set of logics is responsive to a new cell and to an old cell previously combined with said block to determine whether said new cell should be combined with said block; and (d) outputting said set of boundary coordinate designations for said block so as to enable said character recognition means to select certain of said video elements as belonging to said individual character.

4. A method for developing boundaries of an area containing an individual character in a field containing multiple characters so as to isolate said individual character to facilitate recognition thereof by character recognition means, comprising:

(a) scanning said field to produce a stream of video elements representing said character field;

(b) interrogating said video elements with a first set of logics to locate coherent video elements and produce therefrom a plurality of boundary coordinate designations defining a plurality of rectangular cells, each of which represents only a relatively small portion of individual characters of said characters;

(c) interrogating said plurality of boundary coordinate designations defining a plurality of rectangular cells with a second set of logics to produce a set of boundary coordinate designations for a block representing an area containing only said individual character by expanding a set of coordinates defining boundaries of said block whenever said second set of logics combines said cells, said second set of logics completes said block whenever no further cells combine into said block; and (d) outputting said set of boundary coordinate designations for said block so as to enable said character recognition means to select certain of said video elements as belonging to said individual character.

* * * * *